(12) United States Patent
Shverdin

(10) Patent No.: US 12,007,406 B1
(45) Date of Patent: Jun. 11, 2024

(54) ENHANCED ACTIVITY DETECTION BASED ON DEVICE ORIENTATION AND USER HANDEDNESS

(71) Applicant: Amazon Technologies, Inc., Seattle, WA (US)

(72) Inventor: Miro Yakov Shverdin, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 17/036,993

(22) Filed: Sep. 29, 2020

(51) Int. Cl.
*G01P 13/00* (2006.01)
*G01P 15/08* (2006.01)
*H04B 1/3827* (2015.01)
*H04L 67/50* (2022.01)
*H04S 7/00* (2006.01)

(52) U.S. Cl.
CPC .............. *G01P 13/00* (2013.01); *G01P 15/08* (2013.01); *H04B 1/385* (2013.01); *H04L 67/535* (2022.05); *H04S 7/303* (2013.01)

(58) Field of Classification Search
CPC ......... G01P 13/00; G01P 15/08; H04B 1/385; H04L 67/535; H04S 7/303
USPC ....................................................... 702/150
See application file for complete search history.

(56) References Cited

U.S. PATENT DOCUMENTS

| | | | | |
|---|---|---|---|---|
| 10,275,143 | B2* | 4/2019 | Nagaraju | G06F 1/1643 |
| 2015/0382086 | A1* | 12/2015 | Kim | H04W 4/70 |
| | | | | 340/870.07 |
| 2017/0156036 | A1* | 6/2017 | Laakkonen | A61B 5/684 |
| 2017/0230754 | A1* | 8/2017 | Dusan | H04R 29/00 |
| 2018/0172441 | A1* | 6/2018 | Hoque | H04B 1/00 |

* cited by examiner

*Primary Examiner* — Alesa Allgood
*Assistant Examiner* — Byung Ro Lee
(74) *Attorney, Agent, or Firm* — Eversheds Sutherland (US) LLP

(57) ABSTRACT

Devices, systems, and methods are provided for activity detections based on device orientation and user handedness. A method may include determining, by a wearable device, first and second accelerometer data, the first accelerometer data associated with a first axis, and the second accelerometer data associated with a second axis perpendicular to the first axis. The method may include determining a first mean acceleration value based on the first accelerometer data, and determining a second mean acceleration value based on the second accelerometer data. The method may include determining, based on the first mean acceleration value and the second mean acceleration value, an orientation of the wearable device, the orientation indicative of a user wearing the wearable device on a right limb or a left limb. The method may include sending an indication of the orientation to an application of the wearable device.

20 Claims, 9 Drawing Sheets

ENHANCED ACTIVITY DETECTION BASED ON DEVICE ORIENTATION AND USER HANDEDNESS

BACKGROUND

People increasingly are monitoring their activities and consumption habits to improve their health. Some activities that people may monitor include exercise, rest, and sedentary periods. People may be interested in the amount of time that they spend performing certain activities. However, some activity tracking devices may require a particular orientation or position to be able to detect user activity accurately. Therefore, people and devices may benefit from enhanced activity detection.

Figure 1:
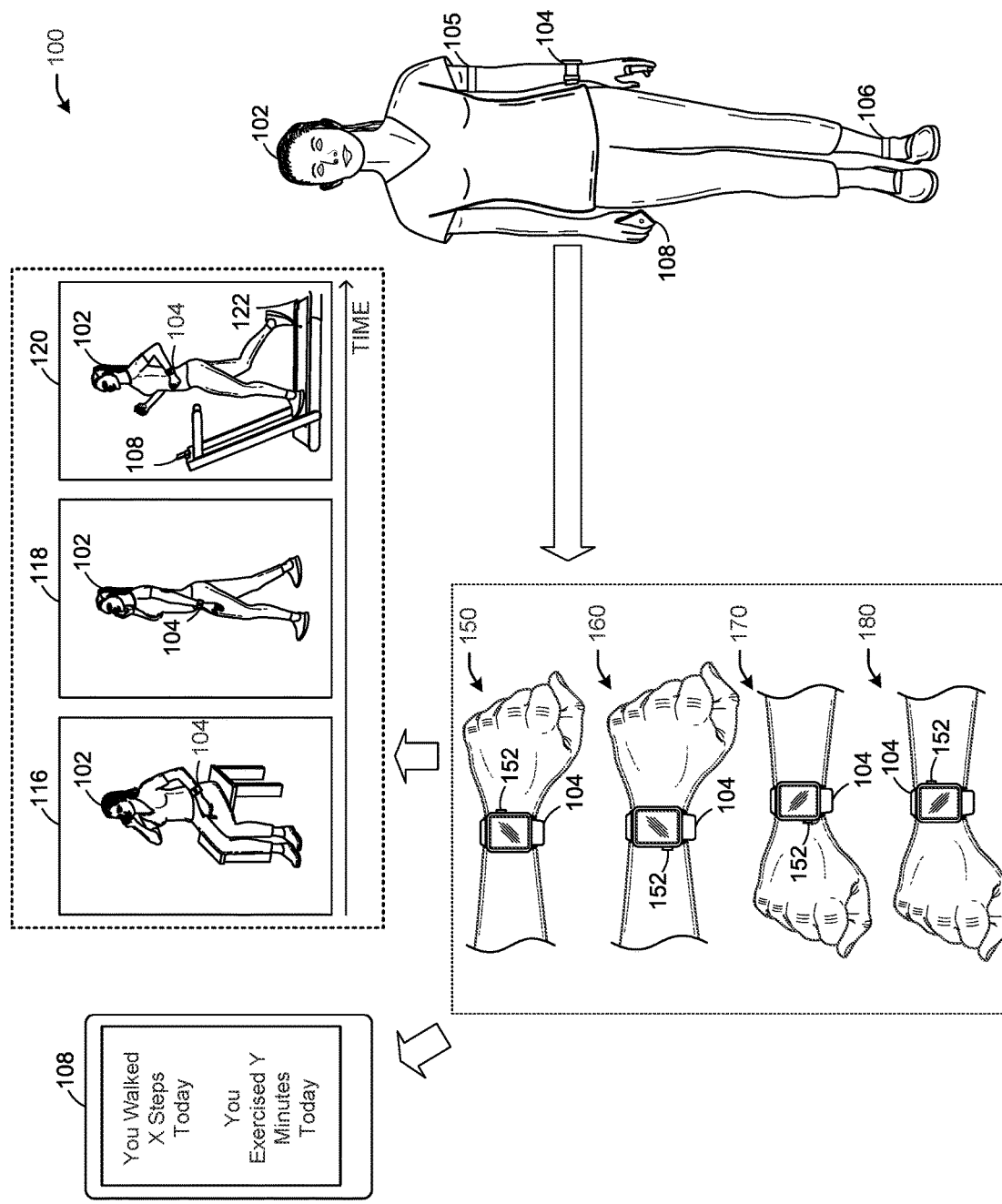
FIG. 1 illustrates an example system for activity detection based on device orientation and user handedness, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for activity detections based on device orientation and user handedness.

A person's activities may be evaluated in a variety of ways. For example, user device data, such as accelerometer or other motion and/or location data, may provide an indication of a person's activity levels (e.g., whether the person with the user device moved a certain amount during a time period). Biometric data, such as heart rate (HR), breathing rate, pulse oximetry, body fat, hydration level, body temperature, blood sugar, and the like, may indicate whether a person is sleeping, sedentary, or active. The combination of device and biometric data may provide indications of activity levels of a person over a period of time, such as a day or a week. With user consent, devices may detect motion and biometric data associated with a user.

Some device applications that track (with user consent) user activity, such as exercise, sleeping, and the like, may detect user activity based on the orientation and/or position of a device. For example, a wearable device may be worn using multiple orientations, such as on an arm, wrist, leg (e.g., collectively referred to as right or left limbs), around the neck or chest, etc. In particular, a wearable watch device (e.g., a watch without a display) may be worn on a user's left wrist or the user's right wrist, and may be worn in different orientations (e.g., the device may be worn so that a button on the device may be more proximal to the user's hand than the user's elbow, or vice versa). The data collected by the device and used to detect and evaluate a user's activity may depend on the orientation of the device, such as on which hand/wrist a watch device is worn, and/or whether the watch device is oriented so that a button is more proximal to a user's hand or to the user's elbow.

To account for the specific orientation with which a device is to be used, some devices may require that a user wear the device in a specific orientation, thereby limiting a user's options regarding how to wear the device. Some devices may require a user to provide inputs confirming the orientation of the device. Therefore, to allow for a better user experience, there is a need for enhanced activity detections based on device orientation and user handedness.

In one or more embodiments, a device may be worn in an orientation corresponding to a left or right wrist on which the device is worn, and may be oriented in an up or down orientation. For example, an up orientation may refer to a button or other feature of the device being more proximal to a user's arm/elbow (e.g., corresponding to the wrist on which the device is worn) than to the user's hand. A down orientation may refer to the button or other feature of the device being more proximal to the user's hand than to the user's arm/elbow. The device, or another device, automatically may determine the device orientation (e.g., that the device is worn on the left or right wrist, and in the up or down orientation on that wrist). The device or the other device may provide state information to any application executed by the device or the other device, thereby allowing the application to consider the device orientation when performing actions such as evaluating user activity.

In one or more embodiments, the device may have one or more sensors to detect device motion data. For example, the device may have an accelerometer capable of detecting device acceleration in multiple directions (e.g., X-Y-Z axes), and the device acceleration may indicate device motion. Device motion data, such as accelerometer data, may be indicative of user motion, and may be used to determine whether a user is active (e.g., running, walking, etc.). Device motion data also may be used to determine device orientation (e.g., both handedness and the up or down orientation on the respective hand on which the device is worn).

In one or more embodiments, the device or the other device may determine the signs (e.g., positive or negative) of the motion data (e.g., accelerometer data) for multiple axes, and based on the signs, may determine the handedness and the up/down orientation. In particular, when acceleration of the device is positive in the X-direction, the X-direction sign may be a "+," and when acceleration of the device is negative in the X-direction, the X-direction sign may be a "-." The X-direction may represent a horizontal axis parallel to the ground on which a device user is standing, and the Y-direction may represent another horizontal parallel to the ground on which the device user is standing, the X-direction being perpendicular to the Y-direction. An example table showing state data for the device orientation is shown below in Table 1.

TABLE 1

Device State Data:

| Axis | Left hand/button away from fingers | Left hand/button toward fingers | Right hand/button away from fingers | Right hand/button toward fingers |
|---|---|---|---|---|
| X | - | + | + | - |
| Y | + | - | + | - |

Referring to Table 1, when the accelerometer data in the X-direction is negative in sign, and the accelerometer data in the Y-direction is positive in sign, the device orientation (e.g., state) may indicate that the device is being worn on the left wrist with the button being on the side of the device that is distal to the left hand/fingers. When the accelerometer data in the X-direction is positive in sign, and the accelerometer data in the Y-direction is negative in sign, the device orientation may indicate that the device is being worn on the left wrist with the button being on the side of the device that is proximal to the left hand/fingers. When the accelerometer data in the X-direction is positive in sign, and the accelerometer data in the Y-direction is positive in sign, the device orientation may indicate that the device is being worn on the right wrist with the button being on the side of the device that is distal to the right hand/fingers. When the accelerometer data in the X-direction is negative in sign, and the accelerometer data in the Y-direction is negative in sign, the device orientation may indicate that the device is being worn on the right wrist with the button being on the side of the device that is proximal to the right hand/fingers.

In one or more embodiments, the device may maintain the device state for use by one or more applications. When the device determines that the user of the device is active (e.g., moving), the device may begin to analyze motion data for a period of time to determine whether the most recently stored device state should be updated to reflect a new device state. For example, when an application is executed on the device, the device may begin monitoring accelerometer data for a time period (e.g., a few seconds, or corresponding to a number of steps taken). The device may determine the device state based on the accelerometer data. The device may store the most recent device state. When the most recent device state represents a change from the previous device state, the device actively may communicate the updated device state to one or more applications, or may communicate to the one or more applications (e.g., using an interrupt or another signal) that the device state has been updated, allowing the one or more applications to verify the most recent device state for application use (e.g., step counting, exercise tracking, etc.). Periodically, the device may evaluate accelerometer data to determine whether the device state has been updated. Device state evaluations may be triggered by application execution, a change in user activity (e.g., as indicated by motion data, biometric data, or an indicator provided by another device), a set or random evaluation time, or the like.

In one or more embodiments, to determine acceleration data signs, the accelerometer data for any direction/axis may be compared to one or more thresholds. A threshold may be zero so that when the accelerometer data is above zero, the sign is positive, and when the accelerometer data is below zero, the sign is negative. The threshold may be adjusted to be above or below zero. Whether a sign is negative or positive may be measured by a confidence level for any direction/axis. For example, the further above or below the threshold the accelerometer data may be above or below the threshold, the more confident the sign determination. Because accelerometer data may be monitored over a time period to determine the device orientation/state (e.g., compared to determining the device orientation/state based on only accelerometer data at one instant in time), the device may use a mean of the accelerometer data in a respective direction during a time period to determine whether the mean indicates a positive or negative sign for the time period in the respective direction.

In one or more embodiments, to determine acceleration data signs, the device may use additional signal processing. For example, the device may use an averaging filter to remove noise from accelerometer data measured during a time period. The averaging filter may include a moving average filter, an infinite response filter (e.g., an exponential moving average filter), or another type of filter. In this manner, the filtered accelerometer signal may be compared to a threshold to determine the sign.

In one or more embodiments, the device may use other data (e.g., in addition to or in place of the accelerometer data) to determine device orientation/state. For example, voice data may indicate the position of one or more microphones of the device, and therefore device orientation/state. In particular, when the user's voice sounds louder based on voice data detected by the one or more device microphones, the louder voice may indicate that a microphone is more proximal to the user than when the voice data sounds softer. Based on the position of a microphone relative to the button or other features of the device, voice data may be indicative of device orientation/state. The device may consider other data, such as a user input and/or device orientation/state determinations made by other devices, to determine device orientation/state. Using beamforming, the device may determine the direction of voice data received by the one or more device microphones. Based on the time of arrival and directionality of any detected voice data, the device may determine the location of a microphone relative to the user whose voice is detected (e.g., the user wearing or holding the device).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for activity detection based on device orientation and user handedness, in accordance with one or more example embodiments of the present disclosure.

Referring to FIG. 1, the system 100 may include a user 102 with multiple devices (e.g., device 104, device 105, device 106, device 108). For example, the user 102 may be wearing the device 104 (e.g., a wrist watch), the device 105 (e.g., an arm band), and/or the device 106 (e.g., an ankle band), and may be holding or carrying the device 108 (e.g., a smartphone). At step 116 (e.g., a time), the user 102 may be sedentary (e.g., sitting). At step 118 (e.g., a time), the user 102 may be walking (e.g., exercising lightly or moderately). At step 120, the user 102 may be jogging or running on a treadmill 122 (e.g., exercising moderately or vigorously). Step 116, step 118, and step 120 may represent different times throughout a day or multiple days (e.g., a week, month, etc.). The user 102 may be wearing or holding any one or more of the device 104, the device 105, the device 106, and/or the device 108 at any of step 116, step 118, and step 120, or any one or more of the device 104, the device 105, the device 106, and/or the device 108 may be otherwise monitoring, with user consent and consistent with appropriate laws, activity of the user 102 as explained further herein.

Still referring to FIG. 1, the device 104, the device 105, the device 106, and/or the device 108 may detect biometric data and/or motion data (e.g., accelerometer data). The motion data may indicate motion and user activity. Applications executed by the device 104, the device 105, the device 106, and/or the device 108 may use the motion data (e.g., to analyze the user's activities, health, sleep, and the like). The applications that may use the motion data may depend on the orientation of the device 104, the device 105, the device 106, and/or the device 108. For example, at orientation 150, the user 102 may wear the device 104 on a left wrist with a button 152 of the device 104 being more proximal to the user's hand than to the user's elbow. At orientation 160, the user 102 may wear the device 104 on a left wrist with the button 152 of the device 104 being more proximal to the user's elbow than to the user's hand. At orientation 170, the user 102 may wear the device 104 on a right wrist with the button 152 of the device 104 being more proximal to the user's hand than to the user's elbow. At orientation 180, the user 102 may wear the device 104 on a right wrist with the button 152 of the device 104 being more proximal to the user's elbow than to the user's hand. The device 104 and/or the device 108 may store the device orientation (e.g., using a table or state machine), allowing any applications that execute on the device 104 and/or the device 108 to access the orientation data.

Figure 2A:
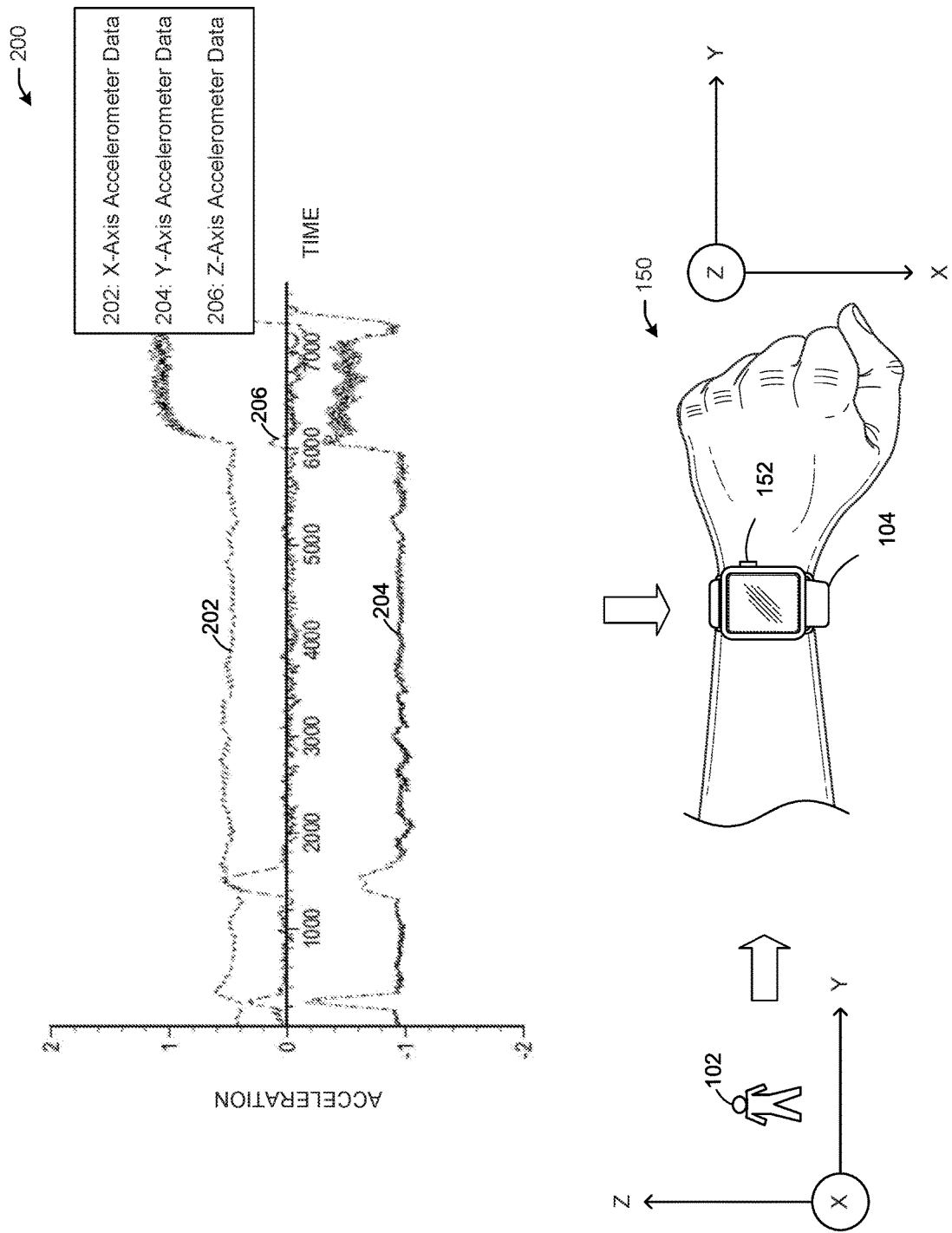
FIG. 2A illustrates an example graph for activity detection based on device orientation and user handedness, in accordance with one or more example embodiments of the present disclosure.
Figure 2B:
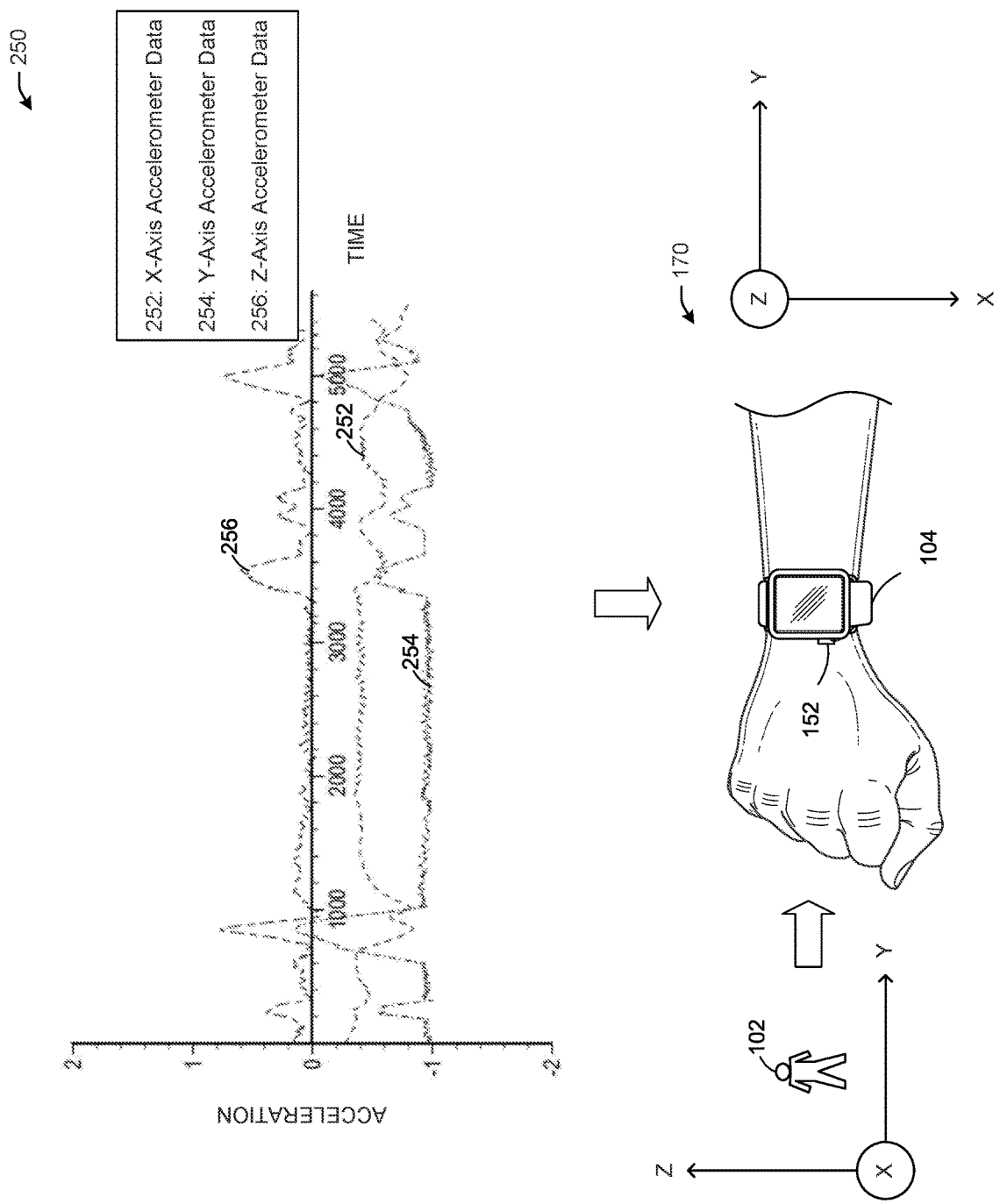
FIG. 2B illustrates an example graph for activity detection based on device orientation and user handedness, in accordance with one or more example embodiments of the present disclosure.
Figure 3:
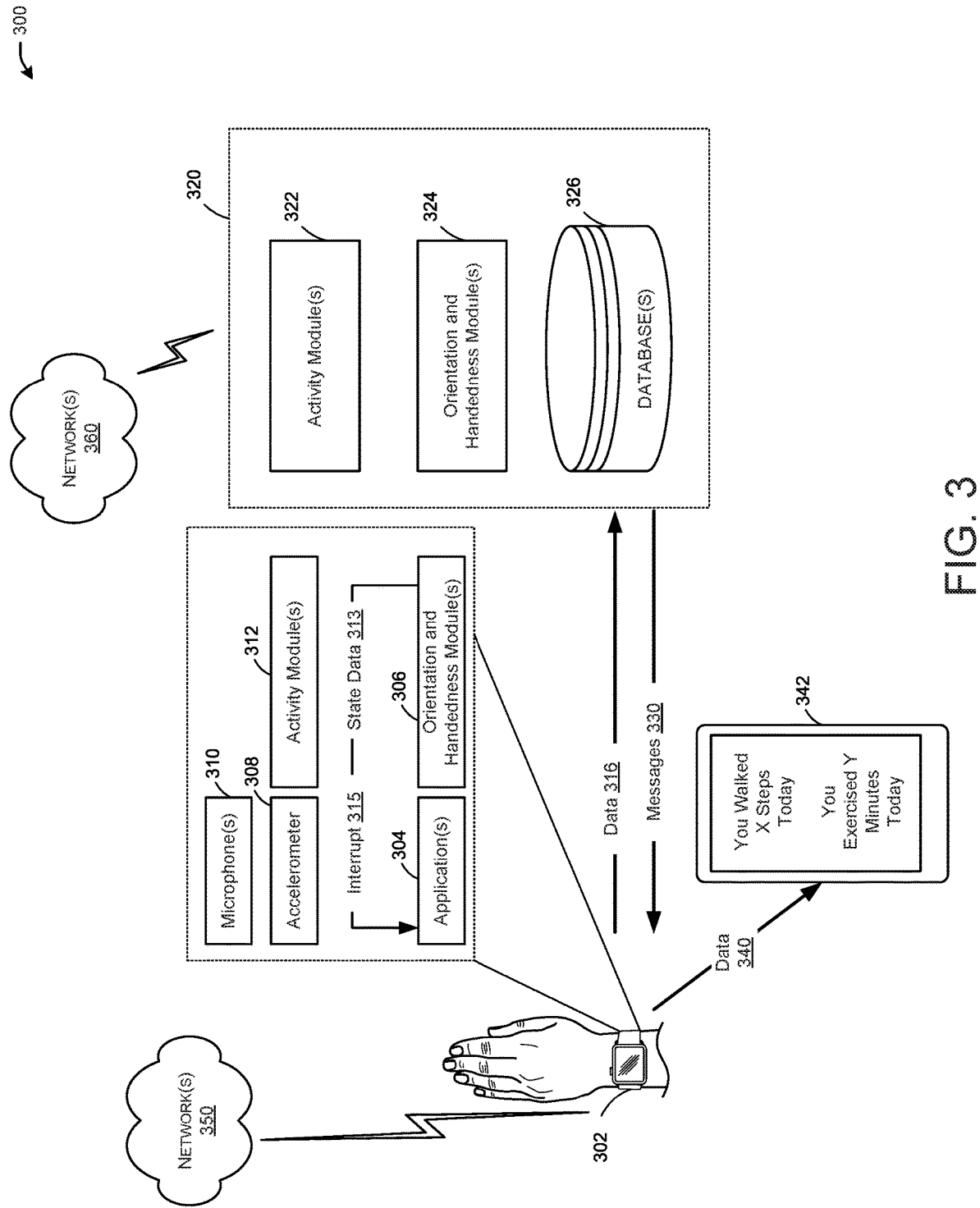
FIG. 3 illustrates an example system for activity detection based on device orientation and user handedness, in accordance with one or more example embodiments of the present disclosure.
Figure 6:
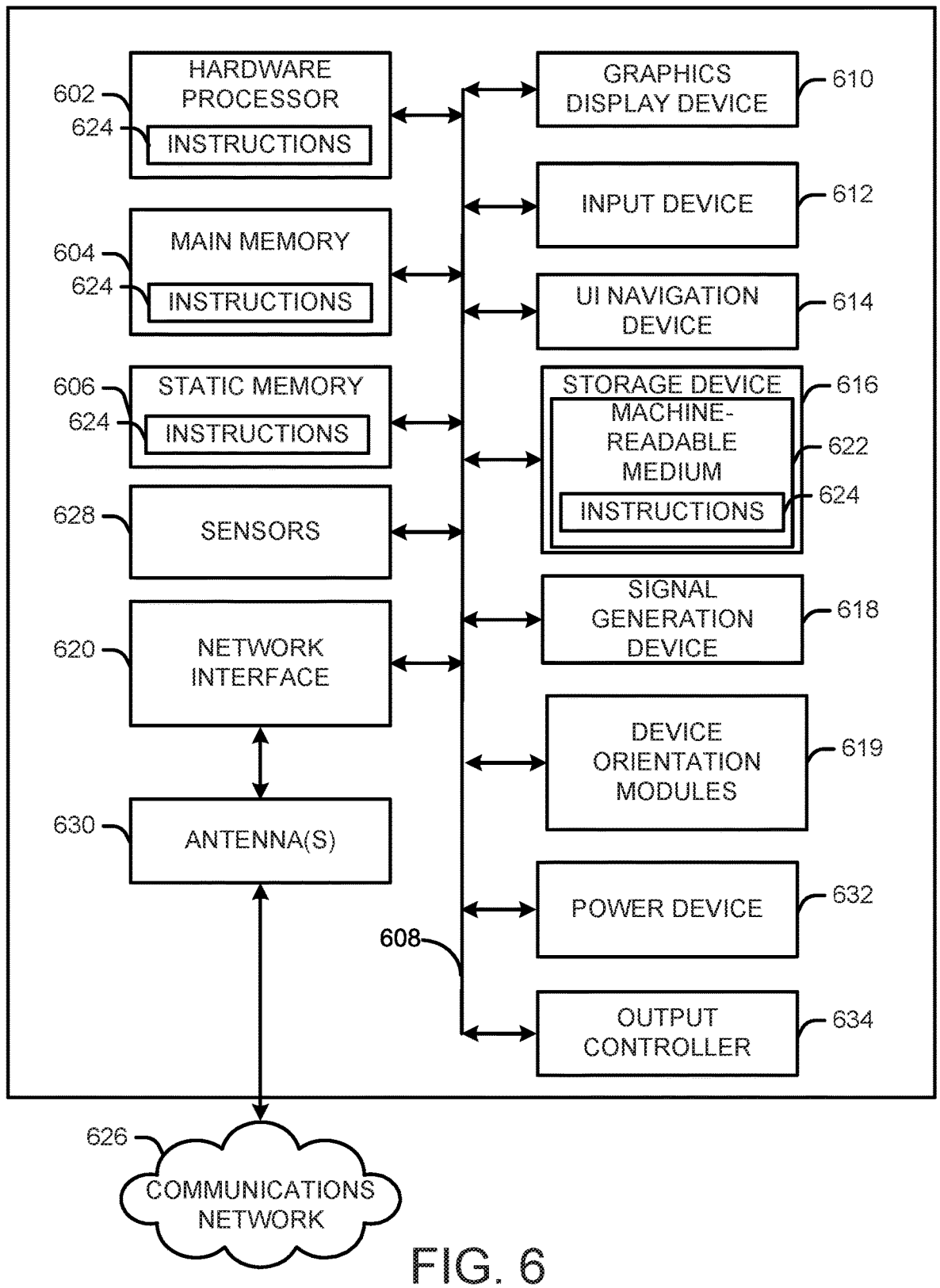
FIG. 6 illustrates a block diagram of an example machine upon which any of one or more techniques (e.g., methods) may be performed, in accordance with one or more example embodiments of the present disclosure.

In one or more embodiments, the device 104, the device 105, the device 106, and/or the device 108 may have one or more sensors (e.g., as shown in FIG. 3 and FIG. 6) to detect device motion data. For example, the device 104, the device 105, the device 106, and/or the device 108 may have an accelerometer capable of detecting device acceleration in multiple directions (e.g., X-Y-Z axes as shown in FIG. 2A and FIG. 2B), and the device acceleration may indicate device motion. Device motion data, such as accelerometer data, may be indicative of user motion, and may be used to determine whether the user 102 is active (e.g., running, walking, etc.). Device motion data also may be used to determine device orientation.

In one or more embodiments, the device 104, the device 105, the device 106, and/or the device 108 may determine the signs (e.g., positive or negative) of the motion data (e.g., accelerometer data) for multiple axes, and based on the signs, may determine the handedness and the up/down orientation. In particular, when acceleration of the device 104, the device 105, the device 106, and/or the device 108 is positive in the X-direction, the X-direction sign may be a "+," and when acceleration of the device 104, the device 105, the device 106, and/or the device 108 is negative in the X-direction, the X-direction sign may be a "−." The X-direction may represent a horizontal axis parallel to the ground on which the user 102 is standing, and the Y-direction may represent another horizontal parallel to the ground on which the user 102 is standing, the X-direction being perpendicular to the Y-direction. An example table showing state data for the device orientation is shown above in Table 1.

In one or more embodiments, the device 104, the device 105, the device 106, and/or the device 108 may maintain the device state for use by one or more applications. When the device 104, the device 105, the device 106, and/or the device 108 determines that the user 102 is active (e.g., moving), the device 104, the device 105, the device 106, and/or the device 108 may begin to analyze motion data for a period of time to determine whether the most recently stored device state should be updated to reflect a new device state. For example, when an application is executed on the device 104, the device 105, the device 106, and/or the device 108, the device 104, the device 105, the device 106, and/or the device 108 may begin monitoring accelerometer data for a time period (e.g., a few seconds, or corresponding to a number of steps taken). The device 104, the device 105, the device 106, and/or the device 108 may determine the device state based on the accelerometer data. The device 104, the device 105, the device 106, and/or the device 108 may store the most recent device state. When the most recent device state represents a change from the previous device state, the device 104, the device 105, the device 106, and/or the device 108 actively may communicate the updated device state to one or more applications, or may communicate to the one or more applications (e.g., using an interrupt or another signal) that the device state has been updated, allowing the one or more applications to verify the most recent device state for application use (e.g., step counting, exercise tracking, etc.). Periodically, the device 104, the device 105, the device 106, and/or the device 108 may evaluate accelerometer data to determine whether the device state has been updated. Device state evaluations may be triggered by application execution, a change in user activity (e.g., as indicated by motion data, biometric data, or an indicator provided by another device), a set or random evaluation time, or the like.

In one or more embodiments, to determine acceleration data signs, the accelerometer data for any direction/axis may be compared to one or more thresholds. A threshold may be zero so that when the accelerometer data is above zero, the sign is positive, and when the accelerometer data is below zero, the sign is negative. The device 104, the device 105, the device 106, and/or the device 108 may adjust the threshold to be above or below zero. Whether a sign is negative or positive may be measured by a confidence level for any direction/axis. For example, the further above or below the threshold the accelerometer data may be above or below the threshold, the more confident the sign determination. Because accelerometer data may be monitored over a time period to determine the device orientation/state (e.g., compared to determining the device orientation/state based on only accelerometer data at one instant in time), the device may use a mean of the accelerometer data in a respective direction during a time period to determine whether the mean indicates a positive or negative sign for the time period in the respective direction.

In one or more embodiments, to determine acceleration data signs, the device 104, the device 105, the device 106, and/or the device 108 may use additional signal processing. For example, the device 104, the device 105, the device 106, and/or the device 108 may use an averaging filter to remove noise from accelerometer data measured during a time period. The averaging filter may include a moving average filter, an infinite response filter (e.g., an exponential moving average filter), or another type of filter. In this manner, the filtered accelerometer signal may be compared to a threshold to determine the sign.

In one or more embodiments, the device 104, the device 105, the device 106, and/or the device 108 may use other data (e.g., in addition to or in place of the accelerometer data) to determine device orientation/state. For example, voice data may indicate the position of a microphone of the device 104, the device 105, the device 106, and/or the device 108 (e.g., as shown in FIG. 3), and therefore device orientation/state. In particular, when the user's voice sounds louder based on voice data detected by the device microphone, the louder voice may indicate that the microphone is more proximal to the user than when the voice data sounds softer. Based on the position of the microphone relative to the button 152 or other features of the device, voice data may be indicative of device orientation/state. The device 104, the device 105, the device 106, and/or the device 108 may consider other data, such as a user input and/or device orientation/state determinations made by other devices, to determine device orientation/state.

In one or more embodiments, the device 104, the device 105, the device 106, and/or the device 108 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, and the like.

FIG. 2A illustrates an example graph 200 for activity detection based on device orientation and user handedness, in accordance with one or more example embodiments of the present disclosure.

Referring to FIG. 2A, the graph 200 may represent device accelerometer data over time (e.g., a time period beginning when a user is active/in motion). Using X-Y-Z axes as shown, accelerometer data 202 may represent the accelerometer data for the X-axis, accelerometer data 204 may represent the accelerometer data for the Y-axis, and accelerometer data 206 may represent the accelerometer data for the Z-axis. As shown, the accelerometer data 206 for the Z-axis is mostly around zero, so the signs of the accelerometer data 202 for the X-axis and the accelerometer data 204 for the Y-axis may be used (e.g., by comparing the signs to Table 1 above) to determine device orientation (e.g., orientation of the device 104 of FIG. 1). As shown, the accelerometer data 202 for the X-axis is above zero during the time period (e.g., a positive quantitative sign), and the accelerometer data 204 for the Y-axis is below zero during the time period (e.g., a negative quantitative sign).

Still referring to FIG. 2A, the accelerometer data of the graph 200 corresponds to the orientation 150 of FIG. 1. For example, the device 104 may determine that the accelerometer data 202 for the X-axis has a positive quantitative sign, and that the accelerometer data 204 for the Y-axis has a negative quantitative sign. The corresponding signs for the accelerometer data on the X and Y axes may correspond to the orientation 150, in which the device 104 is worn on a left wrist with the button 152 of the device facing the user's fingers.

FIG. 2B illustrates an example graph 250 for activity detection based on device orientation and user handedness, in accordance with one or more example embodiments of the present disclosure.

Referring to FIG. 2B, the graph 250 may represent device accelerometer data over time (e.g., a time period beginning when a user is active/in motion). Using X-Y-Z axes as shown, accelerometer data 252 may represent the accelerometer data for the X-axis, accelerometer data 254 may represent the accelerometer data for the Y-axis, and accelerometer data 256 may represent the accelerometer data for the Z-axis. The signs of the accelerometer data 252 for the X-axis and the accelerometer data 254 for the Y-axis may be used (e.g., by comparing the signs to Table 1 above) to determine device orientation (e.g., orientation of the device 104 of FIG. 1). As shown, the accelerometer data 252 for the X-axis is below zero during the time period (e.g., a negative quantitative sign), and the accelerometer data 254 for the Y-axis is below zero during the time period (e.g., a negative quantitative sign).

Still referring to FIG. 2B, the accelerometer data of the graph 250 corresponds to the orientation 170 of FIG. 1. For example, the device 104 may determine that the accelerometer data 252 for the X-axis has a negative quantitative sign, and that the accelerometer data 254 for the Y-axis has a negative quantitative sign. The corresponding signs for the accelerometer data on the X and Y axes may correspond to the orientation 170, in which the device 104 is worn on a right wrist with the button 152 of the device facing the user's fingers.

While the orientation 150 is shown in FIG. 2A and the orientation 170 is shown in FIG. 2B, other orientations of the device 104 may be identified based on graphs showing accelerometer data along multiple axes. Based on whether the signs of the accelerometer data along the X and Y axes are positive and/or negative (e.g., whether the acceleration data have positive and/or negative values), the device orientation may be identified (e.g., using the Table 1 above).

In one or more embodiments, the accelerometer data of FIG. 2A and FIG. 2B may be filtered accelerometer data. For example, the device 104 may use an averaging filter to remove noise from accelerometer data measured during a time period. The averaging filter may include a moving average filter, an infinite response filter (e.g., an exponential moving average filter), or another type of filter. In this manner, the filtered accelerometer signal may be compared to a threshold to determine the sign.

Referring to FIGS. 2A and 2B, the acceleration data shown indicates "normal" movement of a person in which the acceleration data exhibits a periodic oscillation. A device, such as the device 104 of FIG. 1, may determine when a person exhibits normal movement by identifying a periodic nature of the acceleration data in multiple directions, and may use the periodic acceleration data to analyze the device orientation. When acceleration data of a device is not periodic, the device may ignore the non-periodic data (e.g., may avoid using non-periodic data in the orientation analysis).

FIG. 3 illustrates an example system 300 for activity detection based on device orientation and user handedness, in accordance with one or more example embodiments of the present disclosure.

Referring to FIG. 3, the system 300 may include a wearable device 302 (e.g., similar to the device 104 of FIG. 1). The wearable device 302 may include one or more executable applications 304 (e.g., for analyzing user activity, sleep, health, etc. based on device motion data and/or biometric data), one or more orientation and handedness modules 306 (e.g., for determining device orientation), an accelerometer 308 (e.g., for detecting device motion), one or more microphones 310 (e.g., for detecting sounds such as voice utterances by the user 102 of FIG. 1), and one or more activity modules 312 (e.g., for determining whether a user is active and/or performing a particular activity, such as walking, running, etc.). Periodically and/or when the one or more activity modules 312 detect user activity, the one or more orientation and handedness modules 306 may analyze accelerometer data detected by the accelerometer 308, and may determine an orientation of the device 302 (e.g., using the Table 1 above). For example, the one or more activity modules 312 may determine that a user's HR, breathing rate, pulse oximetry, body fat, hydration level, body temperature, blood sugar, and the like, may indicate whether a person is sleeping, sedentary, or active (e.g., based on the biometric data being above or below one or more thresholds). In particular, a HR higher than a threshold HR may indicate that a person is active/in motion. The one or more orientation and handedness modules 306 may provide state data 313 (e.g., an indication of the device orientation) and/or an interrupt 315 (e.g., indicating that the device orientation has been updated from a previous orientation) to the one or more executable applications 304.

Still referring to FIG. 3, the device 302 may send data 316 to a remote computer 320 (e.g., a cloud-based server or other device). The data 316 may include accelerometer data and/or biometric data. The remote computer 320 may include one or more activity modules 322 (e.g., for determining whether a user is active and/or performing a particular activity, such as walking, running, etc.), one or more orientation and handedness modules 324 (e.g., for determining device orientation), and one or more databases 326 (e.g., for storing motion data and/or biometric data). In this manner, the one or more activity modules 322 may determine that a user's HR, breathing rate, pulse oximetry, body fat, hydration level, body temperature, blood sugar, and the like, may indicate whether a person is sleeping, sedentary, or active (e.g., based on the biometric data being above or below one or more thresholds as described above). The one or more orientation and handedness modules 324 may analyze accelerometer data (e.g., as provided by the data 316) during a time period when the user is determined to be active (e.g., as shown by the graphs in FIG. 2A and FIG. 2B), and may determine an orientation of the device 302. The one or more activity modules 322 may use data in the one or more databases 326 to determine that the user is active/in motion. The remote computer 320 may send messages 330 to the device 302, such as messages indicating that the user is active, messages indicating the device orientation, and the like.

Still referring to FIG. 3, based on the device orientation, the one or more executable applications 304 may determine user activity, such as the number of steps walked and/or ran by a user, the amount of time that a user has slept and/or exercised, and the like. The device 302 may send data 340 (e.g., indicating the user activity, sleep, etc.) to device 342 (e.g., similar to the device 108 of FIG. 1) for presentation.

The device 302 may be configured to communicate via a communications network 350, and the remote computer 320 may be configured to communicate via the communications network 360, wirelessly or wired (e.g., the same or different wireless communications networks). The communications network 350 and/or the communications network 360 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 350 and/or the communications network 360 may have any suitable communication range associated therewith and may include, for example, global networks (e.g., the Internet), metropolitan area networks (MANs), wide area networks (WANs), local area networks (LANs), or personal area networks (PANs). In addition, communications network 350 and/or the communications network 360 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The device 302 and/or the remote computer 320 may include any suitable processor-driven device including, but not limited to, a mobile device or a non-mobile, e.g., a static, device. For example, device 302 and/or the remote computer 320 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, and the like.

In one or more embodiments, the device 302 or the remote computer 320 may determine the signs (e.g., positive or negative) of the motion data (e.g., accelerometer data) for multiple axes, and based on the signs, may determine the handedness and the up/down orientation. In particular, when acceleration of the device is positive in the X-direction, the X-direction sign may be a "+," and when acceleration of the device is negative in the X-direction, the X-direction sign may be a "−." The X-direction may represent a horizontal axis parallel to the ground on which a device user is standing, and the Y-direction may represent another horizontal parallel to the ground on which the device user is standing, the X-direction being perpendicular to the Y-direction. An example table showing state data for the device orientation is shown above in Table 1.

Referring to Table 1, when the accelerometer data in the X-direction is negative in sign, and the accelerometer data in the Y-direction is positive in sign, the device orientation (e.g., state) may indicate that the device 302 is being worn on the left wrist with the button being on the side of the device 302 that is distal to the left hand/fingers. When the accelerometer data in the X-direction is positive in sign, and the accelerometer data in the Y-direction is negative in sign, the device orientation may indicate that the device 302 is being worn on the left wrist with the button being on the side of the device 302 that is proximal to the left hand/fingers. When the accelerometer data in the X-direction is positive in sign, and the accelerometer data in the Y-direction is positive in sign, the device orientation may indicate that the device 302 is being worn on the right wrist with the button being on the side of the device 302 that is distal to the right hand/fingers. When the accelerometer data in the X-direction is negative in sign, and the accelerometer data in the Y-direction is negative in sign, the device orientation may indicate that the device 302 is being worn on the right wrist with the button being on the side of the device 302 that is proximal to the right hand/fingers.

In one or more embodiments, the device 302 may maintain the device state for use by the one or more executable applications 304. When the device 302 determines that the user of the device 302 (e.g., the user 102 of FIG. 1) is active (e.g., moving), the device 302 may begin to analyze motion data for a period of time to determine whether the most recently stored device state should be updated to reflect a new device state. For example, when an application is executed on the device 302, the device 302 may begin monitoring accelerometer data for a time period (e.g., a few seconds, or corresponding to a number of steps taken). The device 302 may determine the device state based on the accelerometer data. The device 302 may store the most recent device state. When the most recent device state represents a change from the previous device state, the device 302 actively may communicate the updated device state to the one or more executable applications 304, or may communicate to the one or more executable applications 304 that the device state has been updated, allowing the one or more executable applications 304 to verify the most recent device state for application use (e.g., step counting, exercise tracking, etc.). Periodically, the device 302 may evaluate accelerometer data to determine whether the device state has been updated. Device state evaluations may be triggered by application execution, a change in user activity (e.g., as indicated by motion data, biometric data, or an indicator provided by another device), a set or random evaluation time, or the like.

In one or more embodiments, to determine acceleration data signs, the accelerometer data for any direction/axis may be compared to one or more thresholds. A threshold may be zero so that when the accelerometer data is above zero, the sign is positive, and when the accelerometer data is below zero, the sign is negative. The threshold may be adjusted to be above or below zero. Whether a sign is negative or positive may be measured by a confidence level for any direction/axis. For example, the further above or below the threshold the accelerometer data may be above or below the threshold, the more confident the sign determination. Because accelerometer data may be monitored over a time period to determine the device orientation/state (e.g., compared to determining the device orientation/state based on only accelerometer data at one instant in time), the device may use a mean of the accelerometer data in a respective direction during a time period to determine whether the mean indicates a positive or negative sign for the time period in the respective direction.

In one or more embodiments, to determine acceleration data signs, the device 302 may use additional signal processing. For example, the one or more orientation and handedness modules 306 may use an averaging filter to remove noise from accelerometer data measured during a time period. The averaging filter may include a moving average filter, an infinite response filter (e.g., an exponential moving average filter), or another type of filter. In this manner, the filtered accelerometer signal may be compared to a threshold to determine the sign.

In one or more embodiments, the device may use other data (e.g., in addition to or in place of the accelerometer data) to determine device orientation/state. For example, voice data may indicate the position of the one or more microphones 310 of the device 302, and therefore device orientation/state. In particular, when the user's voice sounds louder based on voice data detected by the one or more microphones 310, the louder voice may indicate that the one or more microphones 310 are more proximal to the user than when the voice data sounds softer. Based on the position of the one or more microphones 310 relative to the button (e.g., the button 154 of FIG. 1) or other features of the device 302, voice data may be indicative of device orientation/state. The device 302 may consider other data, such as a user input and/or device orientation/state determinations made by other devices, to determine device orientation/state. The device 302 may use beamforming to detect the direction from which voice data is detected by the one or more microphones 310. Using the time of arrival and direction of any voice data, the device 302 may determine the relative orientation of the one or more microphones 310, and therefore the orientation of the device 302 (e.g., based on where the one or more microphones 310 are positioned in/on the device 302).

Figure 4A:
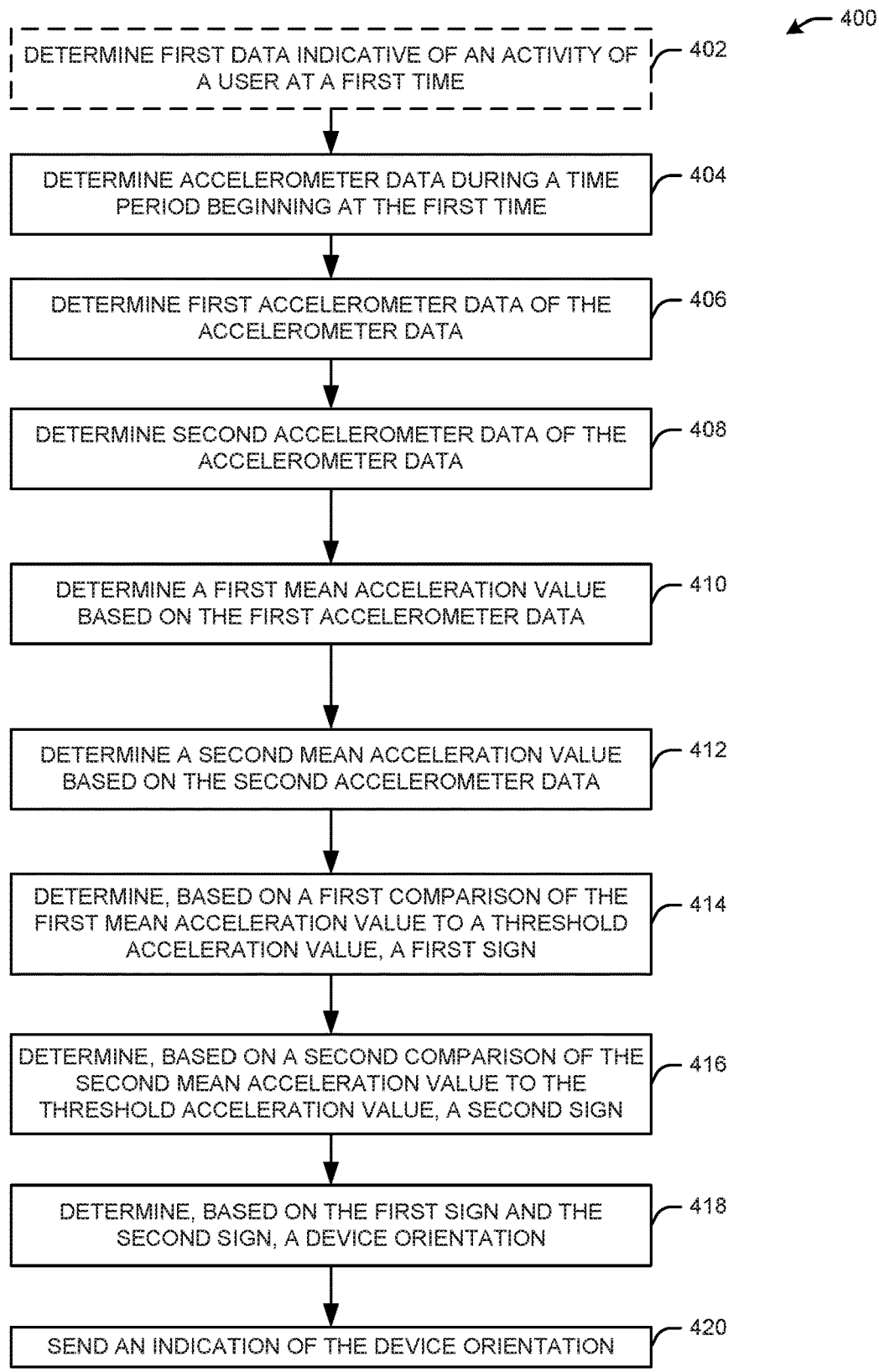
FIG. 4A illustrates an example flow diagram for a process for activity detection based on device orientation and user handedness, in accordance with one or more example embodiments of the present disclosure.

FIG. 4A illustrates an example flow diagram for a process 400 for activity detection based on device orientation and user handedness, in accordance with one or more example embodiments of the present disclosure.

At block 402, a device (e.g., the device 104 of FIG. 1, the device 108 of FIG. 1, the device 302 of FIG. 3, the remote computer 320 of FIG. 3) optionally may determine first data indicative of user activity at a first time. For example, user device data, such accelerometer or other motion and/or location data, may provide an indication of a person's activity levels (e.g., whether the person with the user device moved a certain amount during a time period). Biometric data, such as heart rate (HR), breathing rate, pulse oximetry, body fat, hydration level, body temperature, blood sugar, and the like, may indicate whether a person is sleeping, sedentary, or active. The combination of device and biometric data may provide indications of activity levels of a person over a period of time, such as a day or a week. With user consent, devices may detect motion and biometric data associated with a user. Alternatively, user activity may be indicated by execution of one or more activity evaluation applications (e.g., the one or more executable applications 304 of FIG. 3). In this manner, data indicating that a user is active may trigger the collection and analysis of device motion data for the purpose of determining device orientation.

At block 404, the device may determine accelerometer data during a time period beginning at the first time (e.g., the time periods shown in FIG. 2A and FIG. 2B). In one or more embodiments, the device may have an accelerometer (e.g., the accelerometer 308 of FIG. 3) capable of detecting device acceleration in multiple directions (e.g., X-Y-Z axes), and the device acceleration may indicate device motion. Device motion data, such as accelerometer data, may be indicative of user motion, and may be used to determine whether a user is active (e.g., running, walking, etc.). Device motion data also may be used to determine device orientation (e.g., both handedness and the up or down orientation on the respective hand on which the device is worn).

At block 406, the device may determine first accelerometer data of the accelerometer data (e.g., the X-axis accelerometer data 202 of FIG. 2A, the X-axis accelerometer data 252 of FIG. 2B). At block 408, he device may determine second accelerometer data of the accelerometer data (e.g., the Y-axis accelerometer data 206 of FIG. 2A, the Y-axis accelerometer data 254 of FIG. 2B). In this manner, the device may determine the first accelerometer data along one axis parallel to the ground on which the user stands, and the second accelerometer data along another axis parallel to the ground and perpendicular to the first axis. The device may filter the first and second accelerometer data using one or more filters (e.g., averaging filters), allowing for an average or mean accelerometer value to be determined along both the first and second axes. While blocks 406 and 408 are shown as separate steps in the process 400, they may occur simultaneously. In this manner, the device may determine the first and second accelerometer data simultaneously or in any sequential order.

At block 410, the device may determine a first mean accelerometer value based on the first accelerometer data. At block 412, the device may determine a second mean accelerometer value based on the second accelerometer data. The first mean accelerometer value along the first axis may have a first sign (e.g., positive or negative), and the second mean accelerometer value along the second axis may have a second sign (e.g., positive or negative). In this manner, filtering may allow the device to determine respective mean acceleration values along multiple axes during a time period when a user is active.

At block 414, the device may determine a first quantitative sign (e.g., positive or negative) of the first mean accelerometer value. At block 416, the device may determine a second quantitative sign (e.g., positive or negative) of the second mean accelerometer value. The first and second quantitative signs may be determined by comparing the first mean accelerometer value and the second mean accelerometer value to a threshold accelerometer threshold, which may be zero or another number. When a mean accelerometer value is above the threshold, the quantitative sign for the mean accelerometer value may be positive. When a mean accelerometer value is below the threshold, the quantitative sign for the mean accelerometer value may be negative.

At block 418, the device may determine, based on the first quantitative sign and the second quantitative sign, a device orientation. For example, comparing the signs to the Table 1 above, the device may determine whether the combination of the first sign and the second sign may correspond to a predetermined device orientation indicative of the arm/hand on which a user wears a device (e.g., the device or another device), and whether features (e.g., the button 154 of FIG. 1, the one or more microphones 310 of FIG. 3) are more proximal to a user's hand/fingers or to the user's arm/elbow (e.g., the orientation 150 of FIG. 1, the orientation 160 of FIG. 1, the orientation 170 of FIG. 1, the orientation 180 of FIG. 1). In this manner, the device may evaluate accelerometer or other motion data in multiple axial directions to determine whether the acceleration is positive and/or negative quantitatively in either or both directions, and based on the combination of positive and/or negative accelerometer values over a time period (e.g., greater than an instant), determine a device orientation indicative of user handedness and/or device positioning.

At block 420, the device may send an indication of the device orientation to one or more applications executable by the device, and/or to one or more other devices. The indication may indicate that the device orientation has been updated, and the device may store the most updated device orientation for reference by an application, or the indication may include the device orientation, thereby notifying an application or other device of the orientation that has been determined. The applications and/or other devices may use the device orientation to determine user activities, sleep, health, and the like.

Figure 4B:
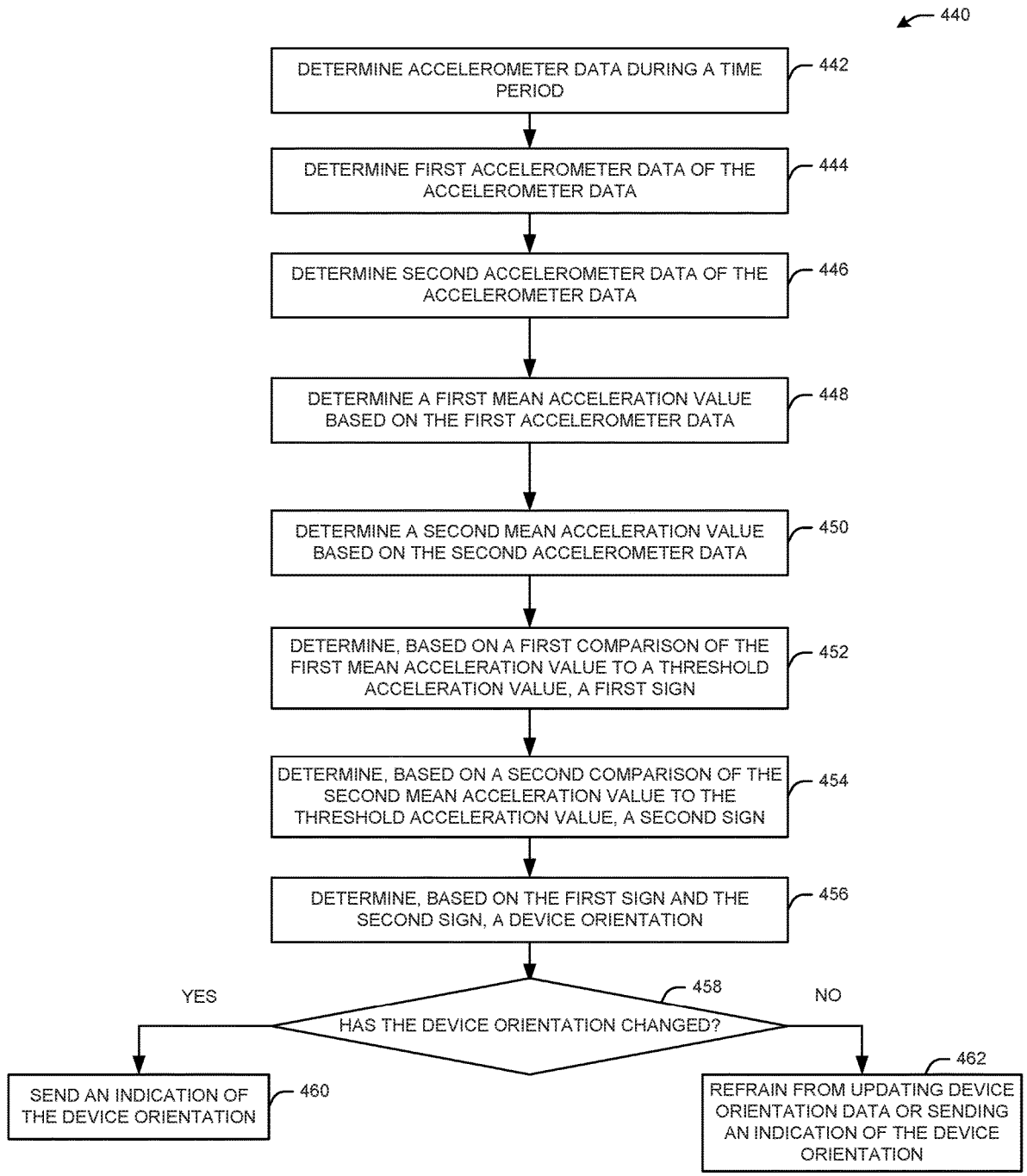
FIG. 4B illustrates an example flow diagram for a process for activity detection based on device orientation and user handedness, in accordance with one or more example embodiments of the present disclosure.

FIG. 4B illustrates an example flow diagram for a process 440 for activity detection based on device orientation and user handedness, in accordance with one or more example embodiments of the present disclosure.

At block 442, a device (e.g., the device 104 of FIG. 1, the device 108 of FIG. 1, the device 302 of FIG. 3, the remote computer 320 of FIG. 3) may determine accelerometer data during a time period beginning at a first time (e.g., the time periods shown in FIG. 2A and FIG. 2B). The time period may be longer than an instant. In one or more embodiments, the device may have an accelerometer (e.g., the accelerometer 308 of FIG. 3) capable of detecting device acceleration in multiple directions (e.g., X-Y-Z axes), and the device acceleration may indicate device motion. Device motion data, such as accelerometer data, may be indicative of user motion, and may be used to determine whether a user is active (e.g., running, walking, etc.). Device motion data also may be used to determine device orientation (e.g., both handedness and the up or down orientation on the respective hand on which the device is worn).

At block 444, the device may determine first accelerometer data of the accelerometer data (e.g., the X-axis accelerometer data 202 of FIG. 2A, the X-axis accelerometer data 252 of FIG. 2B). At block 446, he device may determine second accelerometer data of the accelerometer data (e.g., the Y-axis accelerometer data 206 of FIG. 2A, the Y-axis accelerometer data 254 of FIG. 2B). In this manner, the device may determine the first accelerometer data along one axis parallel to the ground on which the user stands, and the second accelerometer data along another axis parallel to the ground and perpendicular to the first axis. The device may filter the first and second accelerometer data using one or more filters (e.g., averaging filters), allowing for an average or mean accelerometer value to be determined along both the first and second axes. While blocks 444 and 446 are shown as separate steps in the process 440, they may occur simultaneously. In this manner, the device may determine the first and second accelerometer data simultaneously or in any sequential order.

At block 448, the device may determine a first mean accelerometer value based on the first accelerometer data. At block 450, the device may determine a second mean accelerometer value based on the second accelerometer data. The first mean accelerometer value along the first axis may have a first sign (e.g., positive or negative), and the second mean accelerometer value along the second axis may have a second sign (e.g., positive or negative). In this manner, filtering may allow the device to determine respective mean acceleration values along multiple axes during a time period when a user is active.

At block 452, the device may determine a first quantitative sign (e.g., positive or negative) of the first mean accelerometer value. At block 454, the device may determine a second quantitative sign (e.g., positive or negative) of the second mean accelerometer value. The first and second quantitative signs may be determined by comparing the first mean accelerometer value and the second mean accelerometer value to a threshold accelerometer threshold, which may be zero or another number. When a mean accelerometer value is above the threshold, the quantitative sign for the mean accelerometer value may be positive. When a mean accelerometer value is below the threshold, the quantitative sign for the mean accelerometer value may be negative.

At block 456, the device may determine, based on the first quantitative sign and the second quantitative sign, a device orientation. For example, comparing the signs to the Table 1 above, the device may determine whether the combination of the first sign and the second sign may correspond to a predetermined device orientation indicative of the arm/hand on which a user wears a device (e.g., the device or another device), and whether features (e.g., the button 154 of FIG. 1, the one or more microphones 310 of FIG. 3) are more proximal to a user's hand/fingers or to the user's arm/elbow (e.g., the orientation 150 of FIG. 1, the orientation 160 of FIG. 1, the orientation 170 of FIG. 1, the orientation 180 of FIG. 1). In this manner, the device may evaluate accelerometer or other motion data in multiple axial directions to determine whether the acceleration is positive and/or negative quantitatively in either or both directions, and based on the combination of positive and/or negative accelerometer values over a time period (e.g., greater than an instant), determine a device orientation indicative of user handedness and/or device positioning.

At block 458, the device may determine whether the device orientation has changed (e.g., compared to a previously determined device orientation from a previous time period). The device may compare the device orientation determined at block 456 to a stored previously determined device orientation to determine whether the new device orientation is the same as or different from the previous device orientation. When the device orientation has changed, the process 440 may continue to block 460. When the device orientation has not changed, the process 44 may continue to block 462.

At block 460, the device may send an indication of the device orientation to one or more applications executable by the device, and/or to one or more other devices. The indication may indicate that the device orientation has been updated, and the device may store the most updated device orientation for reference by an application, or the indication may include the device orientation, thereby notifying an application or other device of the orientation that has been determined. The applications and/or other devices may use the device orientation to determine user activities, sleep, health, and the like.

At block 462, the device may refrain from updating the device orientation or sending an indication of the device orientation. In this manner, when the device determines that the most recently identified device orientation is the same device orientation as previously determined and stored, the device may avoid sending any indication of the new device orientation determination to another device and/or application so that the other device and/or application does not need to update device orientation data. The device may leave the previously determined device orientation data in a state machine that indicates the device orientation, thereby avoiding any trigger for a device or application to query the state machine to determine whether the device orientation has changed over time.

Figure 4C:
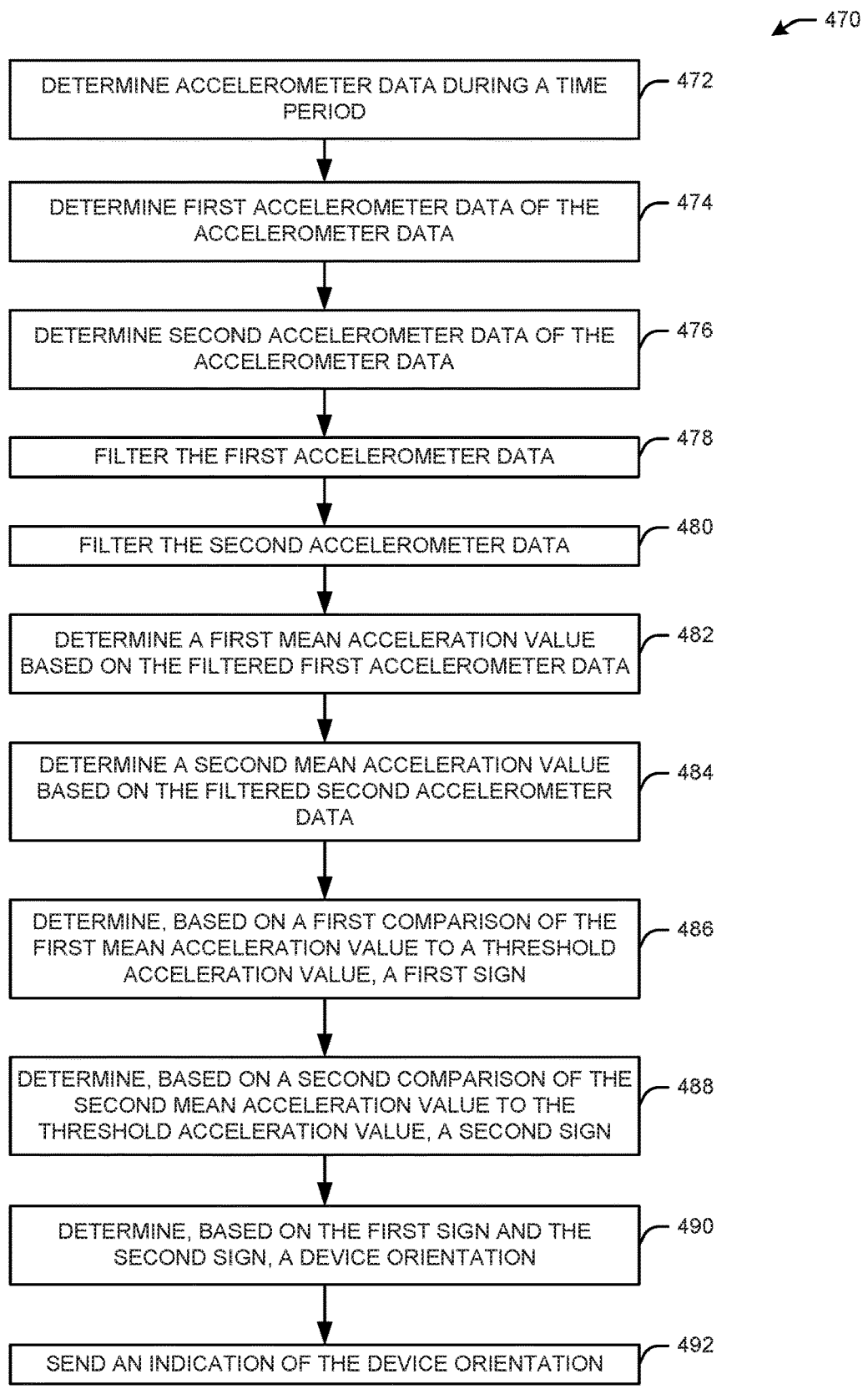
FIG. 4C illustrates an example flow diagram for a process for activity detection based on device orientation and user handedness, in accordance with one or more example embodiments of the present disclosure.

FIG. 4C illustrates an example flow diagram for a process 470 for activity detection based on device orientation and user handedness, in accordance with one or more example embodiments of the present disclosure.

At block 472, a device (e.g., the device 104 of FIG. 1, the device 108 of FIG. 1, the device 302 of FIG. 3, the remote computer 320 of FIG. 3) may determine accelerometer data during a time period (e.g., the time periods shown in FIG. 2A and FIG. 2B). The time period may be longer than an instant. In one or more embodiments, the device may have an accelerometer (e.g., the accelerometer 308 of FIG. 3) capable of detecting device acceleration in multiple directions (e.g., X-Y-Z axes), and the device acceleration may indicate device motion. Device motion data, such as accelerometer data, may be indicative of user motion, and may be used to determine whether a user is active (e.g., running, walking, etc.). Device motion data also may be used to determine device orientation (e.g., both handedness and the up or down orientation on the respective hand on which the device is worn).

At block 474, the device may determine first accelerometer data of the accelerometer data (e.g., the X-axis accelerometer data 202 of FIG. 2A, the X-axis accelerometer data 252 of FIG. 2B). At block 476, he device may determine second accelerometer data of the accelerometer data (e.g., the Y-axis accelerometer data 206 of FIG. 2A, the Y-axis accelerometer data 254 of FIG. 2B). In this manner, the device may determine the first accelerometer data along one axis parallel to the ground on which the user stands, and the second accelerometer data along another axis parallel to the ground and perpendicular to the first axis. While blocks 474 and 476 are shown as separate steps in the process 470, they may occur simultaneously. In this manner, the device may determine the first and second accelerometer data simultaneously or in any sequential order.

At block 478, the device may filter the first accelerometer data using one or more filters (e.g., averaging filters), allowing for an average or mean accelerometer value to be determined along the first axis. At block 480, the device may filter the second accelerometer data using one or more filters (e.g., averaging filters), allowing for an average or mean accelerometer value to be determined along the second axis. The filters used for the data for may be the same filter for multiple axes, or different filters may be used for the data of different respective axes.

At block 482, the device may determine a first mean accelerometer value based on the first accelerometer data. At block 484, the device may determine a second mean accelerometer value based on the second accelerometer data. The first mean accelerometer value along the first axis may have a first sign (e.g., positive or negative), and the second mean accelerometer value along the second axis may have a second sign (e.g., positive or negative). In this manner, filtering may allow the device to determine respective mean acceleration values along multiple axes during a time period when a user is active.

At block 486, the device may determine a first quantitative sign (e.g., positive or negative) of the first mean accelerometer value. At block 488, the device may determine a second quantitative sign (e.g., positive or negative) of the second mean accelerometer value. The first and second quantitative signs may be determined by comparing the first mean accelerometer value and the second mean accelerometer value to a threshold accelerometer threshold, which may be zero or another number. When a mean accelerometer value is above the threshold, the quantitative sign for the mean accelerometer value may be positive. When a mean accelerometer value is below the threshold, the quantitative sign for the mean accelerometer value may be negative.

At block 490, the device may determine, based on the first quantitative sign and the second quantitative sign, a device orientation. For example, comparing the signs to the Table 1 above, the device may determine whether the combination of the first sign and the second sign may correspond to a predetermined device orientation indicative of the arm/hand on which a user wears a device (e.g., the device or another device), and whether features (e.g., the button 154 of FIG. 1, the one or more microphones 310 of FIG. 3) are more proximal to a user's hand/fingers or to the user's arm/elbow (e.g., the orientation 150 of FIG. 1, the orientation 160 of FIG. 1, the orientation 170 of FIG. 1, the orientation 180 of FIG. 1). In this manner, the device may evaluate accelerometer or other motion data in multiple axial directions to determine whether the acceleration is positive and/or negative quantitatively in either or both directions, and based on the combination of positive and/or negative accelerometer values over a time period (e.g., greater than an instant), determine a device orientation indicative of user handedness and/or device positioning.

At block 492, the device may send an indication of the device orientation to one or more applications executable by the device, and/or to one or more other devices. The indication may indicate that the device orientation has been updated, and the device may store the most updated device orientation for reference by an application, or the indication may include the device orientation, thereby notifying an application or other device of the orientation that has been determined. The applications and/or other devices may use the device orientation to determine user activities, sleep, health, and the like.

Figure 5:
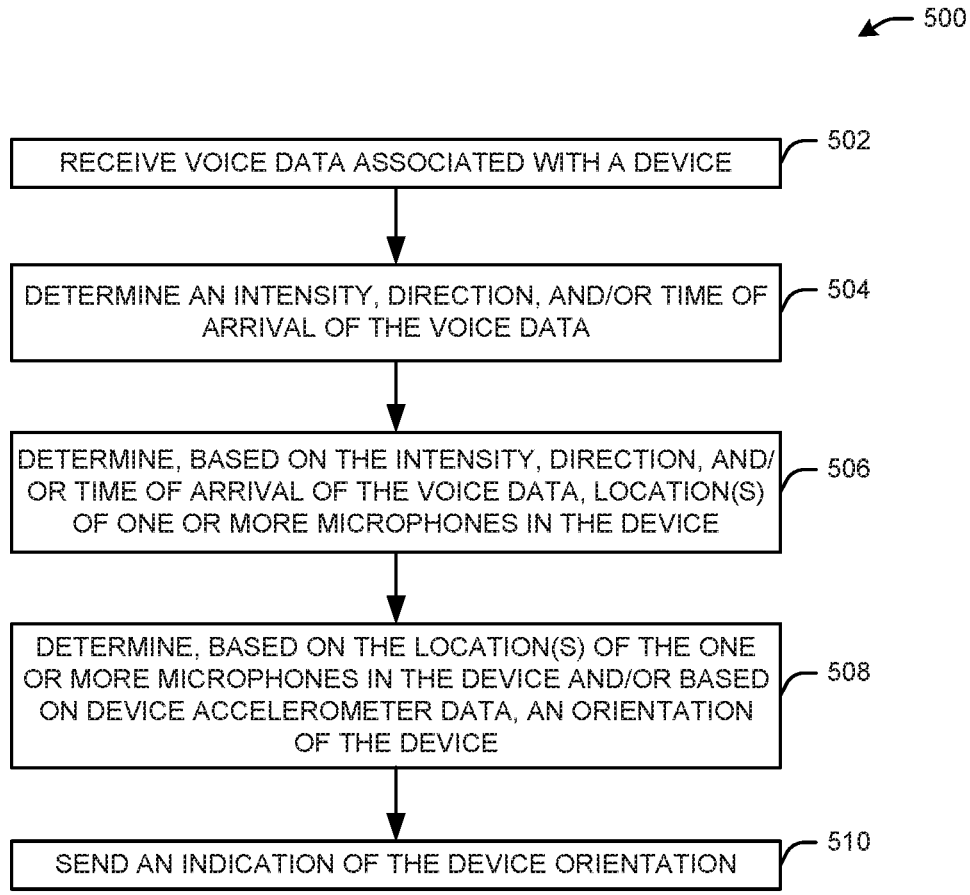
FIG. 5 illustrates an example flow diagram for a process for activity detection based on device orientation and user handedness, in accordance with one or more example embodiments of the present disclosure.

FIG. 5 illustrates an example flow diagram for a process 500 for activity detection based on device orientation and user handedness, in accordance with one or more example embodiments of the present disclosure.

At block 502, a device (e.g., the device 104 of FIG. 1, the device 108 of FIG. 1, the device 302 of FIG. 3, the remote computer 320 of FIG. 3) may receive voice data (e.g., using the one or more microphones 310 of FIG. 3). The voice data may be indicative of a user's voice utterances (e.g., words spoken by a user).

At block 504, the device may determine an intensity (e.g., in decibels), direction, and/or time of arrival of the voice data, indicative of the loudness of the voice data. The intensity may be determined by a power of the voice data over an area, and the intensity may be related to the amplitude of a sound wave representing the voice data. Using beamforming, the device may determine the direction of voice data received by the one or more device microphones. The device may determine the time at which the voice data was detected.

At block 506, the device may determine, based on the intensity, direction, and/or time of arrival of the voice data, a location of the microphone of the device (e.g., relative to a user and/or to other components of the device). For example, when a device microphone is on the same side or side opposite another component (e.g., the button 154 of FIG. 1), the device may determine, based on a device's most recent orientation, whether the microphone is located more proximal to the user's fingers/hand or to the user's elbow/arm. Based on the intensity of voice data for the device's previously determined orientation, when the intensity determined at block 504 is greater than or less than the intensity of voice data for a time period for which the device's previously determined orientation was identified, the device may determine whether the microphone is more proximal to the user (e.g., more proximal to the user's arm/elbow) than the microphone was at the previous device orientation (e.g., as indicated by the intensity of block 506 being greater than the prior intensity), or whether the microphone is further away from the user (e.g., more proximal to the fingers/hand) than the microphone was at the previous device orientation (e.g., as indicated by the intensity of block 506 being less than the prior intensity). Based on the time of arrival and directionality of any detected voice data, the device may determine the location of a microphone relative to the user whose voice is detected (e.g., the user wearing or holding the device).

At block 508, based on the microphone location and/or any accelerometer data for the device, the device may determine the device orientation. For example, as explained in FIGS. 4A-4C, the device may use accelerometer or other device motion data to determine device orientation. In place of or in addition to the accelerometer data, the device may evaluate the voice intensity to determine the relative positioning of the device's microphone, and whether the microphone position indicates the orientation of the device.

At block 510, the device may send an indication of the device orientation to one or more applications executable by the device, and/or to one or more other devices. The indication may indicate that the device orientation has been updated, and the device may store the most updated device orientation for reference by an application, or the indication may include the device orientation, thereby notifying an application or other device of the orientation that has been determined. The applications and/or other devices may use the device orientation to determine user activities, sleep, health, and the like.

The descriptions herein are not meant to be limiting.

FIG. 6 illustrates a block diagram of an example of a machine 600 (e.g., the device 104 of FIG. 1, the device 105, the device 106, and/or the device 108 of FIG. 1, the device 302 of FIG. 3, the remote computer 320 of FIG. 3) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a personal digital assistant (PDA), a mobile telephone, a wearable computer device, a web appliance, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, one or more device orientation modules 619 (e.g., the one or more orientation and handedness modules 306 and 324 of FIG. 3, capable of performing steps according to the blocks of FIGS. 4A-4C and FIG. 5), a network interface device/transceiver 620 coupled to antenna(s) 630, and one or more sensors 628, such as the one or more microphones 310 and/or the accelerometer 308 of FIG. 3, a global positioning system (GPS) sensor, a compass, a magnetometer, gyroscope, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for determining a device orientation, the method comprising:
   determining, by at least one processor of a wearable device, first data indicative of motion associated with a user;
   determining, by the at least one processor, based on the first data, that the motion is associated with walking or running at a first time;
   determining, by the at least one processor, based on the motion being associated with walking or running at the first time, accelerometer data detected by an accelerometer of the wearable device during a time period beginning at the first time and ending at a second time after the first time;
   determining, by the at least one processor, first accelerometer data of the accelerometer data, the first accelerometer data associated with a first axis parallel to the ground;
   determining, by the at least one processor, second accelerometer data of the accelerometer data, the second accelerometer data associated with a second axis perpendicular to the first axis;
   determining, by the at least one processor, a first mean acceleration value based on the first accelerometer data;
   determining, by the at least one processor, a second mean acceleration value based on the second accelerometer data;

determining, by the at least one processor, that the first mean acceleration value has a positive or negative sign and that the second mean acceleration value has positive or negative sign;

determining, by the at least one processor, a button orientation of respective button orientations based on a combination of the positive or negative sign of the first mean acceleration value associated with the first axis and the positive or negative sign of the second mean acceleration value associated with the second axis, the respective button orientations including:

a button of the wearable device being more proximal to a hand of a right arm or a left arm, or to an elbow of the right arm or the left arm; and sending, by the at least one processor, an indication of the orientation to an application of the wearable device.

2. The method of claim 1, further comprising:

identifying a table comprising device orientation data of the respective orientations; and determining that the positive or negative sign of the first mean acceleration value associated with the first axis and the positive or negative sign of the second mean acceleration value associated with the second axis match an entry of the table that corresponds to the orientation, wherein determining the button orientation is based on the positive or negative sign of the first mean acceleration value associated with the first axis and the positive or negative sign of the second mean acceleration value associated with the second axis matching the entry of the table.

3. The method of claim 1, further comprising:

filtering the first accelerometer data using an averaging filter; and filtering the second accelerometer data using the averaging filter, wherein determining the first mean acceleration value is further based on the filtering of the first accelerometer data, and wherein determining the second mean acceleration value is further based on the filtering of the second accelerometer data.

4. The method of claim 1, wherein the wearable device comprises a microphone, the method further comprising:

receiving voice data associated with the user;

determining a direction associated with the voice data; and determining, based on the direction, a location of the microphone.

5. The method of claim 1, wherein a table to which the positive or negative sign of the first mean acceleration value and the positive or negative sign of the second mean acceleration value maps comprises:

a first entry in which a positive sign for the first mean acceleration value and a negative sign for the second mean acceleration value map to a left hand orientation, a second entry in which a negative sign for the first mean acceleration value and a positive sign for the second mean acceleration value map to a left hand orientation, a third entry in which a positive sign for the first mean acceleration value and a positive sign for the second mean acceleration value map to a right hand orientation, and a fourth entry in which a negative sign for the first mean acceleration value and a negative sign for the second mean acceleration value map to a right hand orientation.

6. A method for determining a device orientation, the method comprising:

determining, by at least one processor of a wearable device, accelerometer data detected by an accelerometer of the wearable device during a time period;

determining, by the at least one processor, first accelerometer data of the accelerometer data, the first accelerometer data associated with a first axis parallel to the ground;

determining, by the at least one processor, second accelerometer data of the accelerometer data, the second accelerometer data associated with a second axis perpendicular to the first axis;

determining, by the at least one processor, a first mean acceleration value based on the first accelerometer data;

determining, by the at least one processor, a second mean acceleration value based on the second accelerometer data;

determining, by the at least one processor, that the first mean acceleration value has a positive or negative sign and that the second mean acceleration value has a positive or negative sign;

determining, by the at least one processor, an orientation, of respective orientations, of a component of the wearable device based on a combination of the positive or negative sign of the first mean acceleration value associated with the first axis and the positive or negative sign of the second mean acceleration value associated with the second axis, the respective orientations including:

the component of the wearable device being more proximal to a hand of a user or to an elbow of a right limb or a left limb; and sending, by the at least one processor, an indication of the device orientation to an application of the wearable device.

7. The method of claim 6, further comprising:

determining first data indicative of motion associated with the user;

determining that the first data is periodic; and determining, based on the first data, that the motion is associated with walking or running at a first time, wherein determining the first accelerometer data and the second accelerometer data is based on the determination that the first data is periodic and on the determination that the motion is associated with walking or running at the first time, wherein the time period begins at the first time.

8. The method of claim 6, further comprising:

determining, based on biometric data, that the user is walking or running at a first time, wherein determining the first accelerometer data and the second accelerometer data is based on the determination that the user is walking or running at the first time, wherein the time period begins at the first time.

9. The method of claim 6, further comprising:

determining, based on a first comparison of the first mean acceleration value to a threshold acceleration value, the positive or negative sign of the first mean acceleration value;

determining, based on a second comparison of the second mean acceleration value to the threshold acceleration value, the positive or negative sign of the second mean acceleration value; and determining the orientation based on a combination of the positive or negative sign of the first mean acceleration value and the positive or negative sign of the second mean acceleration value mapping to an entry of a table comprising device orientation data.

10. The method of claim 9, further comprising:
identifying the table; and
determining that the positive or negative sign of the first mean acceleration value and the positive or negative sign of the second mean acceleration value match an entry of the table,
wherein determining the orientation is based on the positive or negative sign of the first mean acceleration value and the positive or negative sign of the second mean acceleration value matching the entry of the table.

11. The method of claim 6, further comprising:
filtering the first accelerometer data using an averaging filter; and
filtering the second accelerometer data using the averaging filter,
wherein determining the first mean acceleration value is further based on the filtering of the first accelerometer data, and
wherein determining the second mean acceleration value is further based on the filtering of the second accelerometer data.

12. The method of claim 6, wherein the wearable device comprises a microphone, the method further comprising:
receiving voice data associated with the user;
determining a direction associated with the voice data; and
determining, based on the direction, a location of the microphone.

13. The method of claim 6, wherein the indication of the device orientation comprises an indication that the orientation of the wearable device is different than a previous orientation of the wearable device.

14. The method of claim 6, wherein the component is a button, and wherein the indication of the orientation comprises a first indication that the user is wearing the wearable device on the right limb or the left limb, and a second indication that the button of the wearable device is more proximal to a hand of the right limb or the left limb, or to an elbow of the right limb or the left limb.

15. The method of claim 6, further comprising:
determining a first activity associated with the user, wherein the first activity is indicative of the orientation;
determining a second activity at a time after the time period;
determining, based on determining the second activity, a second orientation of the component of the wearable device;
determining that the orientation is the same as the second orientation;
refraining from updating a device state indicator based on determining that the orientation is the same as the second orientation; and
refraining from sending to an application the device state indicator based on determining that the orientation is the same as the second orientation.

16. The method of claim 6, wherein a table to which the positive or negative sign of the first mean acceleration value and the positive or negative sign of the second mean acceleration value maps comprises:
a first entry in which a positive sign for the first mean acceleration value and a negative sign for the second mean acceleration value map to a left hand orientation,
a second entry in which a negative sign for the first mean acceleration value and a positive sign for the second mean acceleration value map to a left hand orientation,
a third entry in which a positive sign for the first mean acceleration value and a positive sign for the second mean acceleration value map to a right hand orientation, and
a fourth entry in which a negative sign for the first mean acceleration value and a negative sign for the second mean acceleration value map to a right hand orientation.

17. A wearable device comprising memory coupled to at least one processor, the at least one processor configured to:
determine accelerometer data detected by an accelerometer of the wearable device during a time period;
determine first accelerometer data of the accelerometer data, the first accelerometer data associated with a first axis parallel to the ground;
determine second accelerometer data of the accelerometer data, the second accelerometer data associated with a second axis perpendicular to the first axis;
determine a first mean acceleration value based on the first accelerometer data;
determine a second mean acceleration value based on the second accelerometer data;
determine, that the first mean acceleration value has a positive or negative sign and that the second mean acceleration value has a positive or negative sign;
determine an orientation, of respective orientations, of a component of the wearable device based on a combination of that the positive or negative sign of the first mean acceleration value and the positive or negative sign of the second mean acceleration value
the respective orientations including:
the component of the wearable device being more proximal to a hand of a right limb of a user or a left limb of the user, or to an elbow of the right limb or the left limb; and
send an indication of the orientation to an application of the wearable device.

18. The wearable device of claim 17, wherein the at least one processor is further configured to:
determine first data indicative of motion associated with the user; and
determine, based on the first data, that the motion is associated with walking or running at a first time,
wherein to determine the accelerometer data is based on the determination that the motion is associated with walking or running at the first time, wherein the time period begins at the first time.

19. The wearable device of claim 17, wherein the at least one processor is further configured to:
determine, based on biometric data, that the user is walking or running at a first time,
wherein to determine the accelerometer data is based on the determination that the user is walking or running at the first time, wherein the time period begins at the first time.

20. The wearable device of claim 17, wherein a table to which the positive or negative sign of the first mean acceleration value and the positive or negative sign of the second mean acceleration value maps comprises:
a first entry in which a positive sign for the first mean acceleration value and a negative sign for the second mean acceleration value map to a left hand orientation,
a second entry in which a negative sign for the first mean acceleration value and a positive sign for the second mean acceleration value map to a left hand orientation, a third entry in which a positive sign for the first mean acceleration value and a positive sign for the second mean acceleration value map to a right hand orientation, and a fourth entry in which a negative sign for the first mean acceleration value and a negative sign for the second mean acceleration value map to a right hand orientation.

\* \* \* \* \*